United States Patent
Wagers et al.

(10) Patent No.: US 9,982,912 B2
(45) Date of Patent: May 29, 2018

(54) FURNACE CABINET WITH NOZZLE BAFFLES

(71) Applicant: Trane International Inc., Piscataway, NJ (US)

(72) Inventors: Nathan Wagers, Henderson, TX (US); Rosario Totaro, Ewing, NJ (US); Bright Wei Liang Sun, Shanghai (CN); Shuo Zhao, Shanghai (CN)

(73) Assignee: Trane International Inc., Piscataway, NJ (US)

( * ) Notice: Subject to any disclaimer, the term of this patent is extended or adjusted under 35 U.S.C. 154(b) by 245 days.

(21) Appl. No.: 14/933,695

(22) Filed: Nov. 5, 2015

(65) Prior Publication Data

US 2016/0131397 A1    May 12, 2016

Related U.S. Application Data

(60) Provisional application No. 62/076,974, filed on Nov. 7, 2014.

(51) Int. Cl.
  *F24H 3/08* (2006.01)
  *F24H 9/00* (2006.01)

(52) U.S. Cl.
  CPC .......... *F24H 9/0068* (2013.01); *F24H 3/087* (2013.01)

(58) Field of Classification Search
  USPC ............................................ 126/99 D, 110 R
  See application file for complete search history.

(56) References Cited

U.S. PATENT DOCUMENTS

| | | | |
|---|---|---|---|
| 3,394,695 A * | 7/1968 | Boden | F24H 3/105 126/110 R |
| 4,561,421 A * | 12/1985 | Hwang | F24H 3/065 126/110 R |
| 4,895,137 A | 1/1990 | Jones et al. | |
| 6,564,794 B1 | 5/2003 | Zia et al. | |
| 6,564,795 B1 | 5/2003 | Sears et al. | |
| 6,732,728 B2 * | 5/2004 | Hill | F24H 3/105 126/110 R |
| 8,656,905 B2 | 2/2014 | Noman et al. | |
| 2013/0075062 A1 | 3/2013 | Noman et al. | |
| 2014/0158115 A1 | 6/2014 | Noman et al. | |

* cited by examiner

*Primary Examiner* — Avinash Savani
(74) *Attorney, Agent, or Firm* — Conley Rose, P.C.; J. Robert Brown, Jr.

(57) ABSTRACT

A condensing gas-fired furnace has a furnace cabinet, a primary heat exchanger, a secondary heat exchanger located upstream relative to the primary heat exchanger with regard to location within a circulation airflow path, a first baffle carried by a first wall of the furnace cabinet, and a second baffle carried by a second wall of the furnace cabinet, wherein the second baffle is located opposite the first baffle, and wherein the second wall is located opposite the first wall. The first baffle and the second baffle cooperate to form a nozzle within the furnace cabinet. A third baffle and a fourth baffle extend from the bottom of the first baffle and the second baffle, respectively, to the blower deck located adjacent to a secondary heat exchanger.

20 Claims, 16 Drawing Sheets

FURNACE CABINET WITH NOZZLE BAFFLES

CROSS-REFERENCE TO RELATED APPLICATIONS

The present application claims priority under 35 U.S.C. 119(e) to U.S. Provisional Patent Application No. 62/076,974 filed on Nov. 7, 2014 by Wagers, et al., and entitled "Furnace Cabinet with Nozzle Baffles," the disclosure of which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some heating, ventilation, and/or air conditioning (HVAC) systems often comprise a furnace for heating and/or otherwise conditioning interior spaces. Some HVAC systems comprise furnaces with baffles configured to redirect airflow into contact with heat exchangers. In some cases, baffles are placed in a heat exchanger compartment to reduce primary tube temperatures and increase the life expectancy of such tubes. In some furnaces, there may be a trade-off between reducing the tube temperatures, increasing air velocities, and increasing pressure drop, and thus increasing power consumption of a circulation fan blower motor. As tube temperatures decrease, external air velocities may increase, pressure drops may increase, power consumption may increase, and furnace fan efficiency may decrease.

SUMMARY

In some embodiments of the disclosure, a furnace is disclosed as comprising: a furnace cabinet; a primary heat exchanger; a secondary heat exchanger located upstream relative to the primary heat exchanger with regard to location within a circulation airflow path; a first baffle carried by a first wall of the furnace cabinet; and a second baffle carried by a second wall of the furnace cabinet, wherein the second baffle is located opposite the first baffle, and wherein the second wall is located opposite the first wall; wherein the first baffle and the second baffle cooperate to form a nozzle within the furnace cabinet.

In other embodiments of the disclosure, providing a furnace comprising a furnace cabinet, a fan, a primary heat exchanger, a secondary heat exchanger located upstream relative to the primary heat exchanger with regard to location within a circulation airflow path, a first baffle carried by a first wall of the furnace cabinet, and a second baffle carried by a second wall of the furnace cabinet, wherein the second baffle is located opposite the first baffle, and wherein the second wall is located opposite the first wall; operating the fan to produce a circulation airflow; directing the circulation airflow towards the primary heat exchanger with each of the first baffle and the second baffle; and exchanging heat between the circulation airflow and the primary heat exchanger.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Some furnaces may have airflow paths that are not optimized for contacting a heat exchanger with the airflow through the airflow paths. Allowing air to pass through a furnace while producing unnecessary recirculation patterns and separation zones adjacent to a heat exchanger may reduce the efficiency of the furnace. In some embodiments of this disclosure, a condensing gas-fired furnace is provided that efficiently manages airflow through the furnace, increases airflow contact with a heat exchanger installed in the furnace, and consequently increases the efficiency of the furnace.

Figure 1:
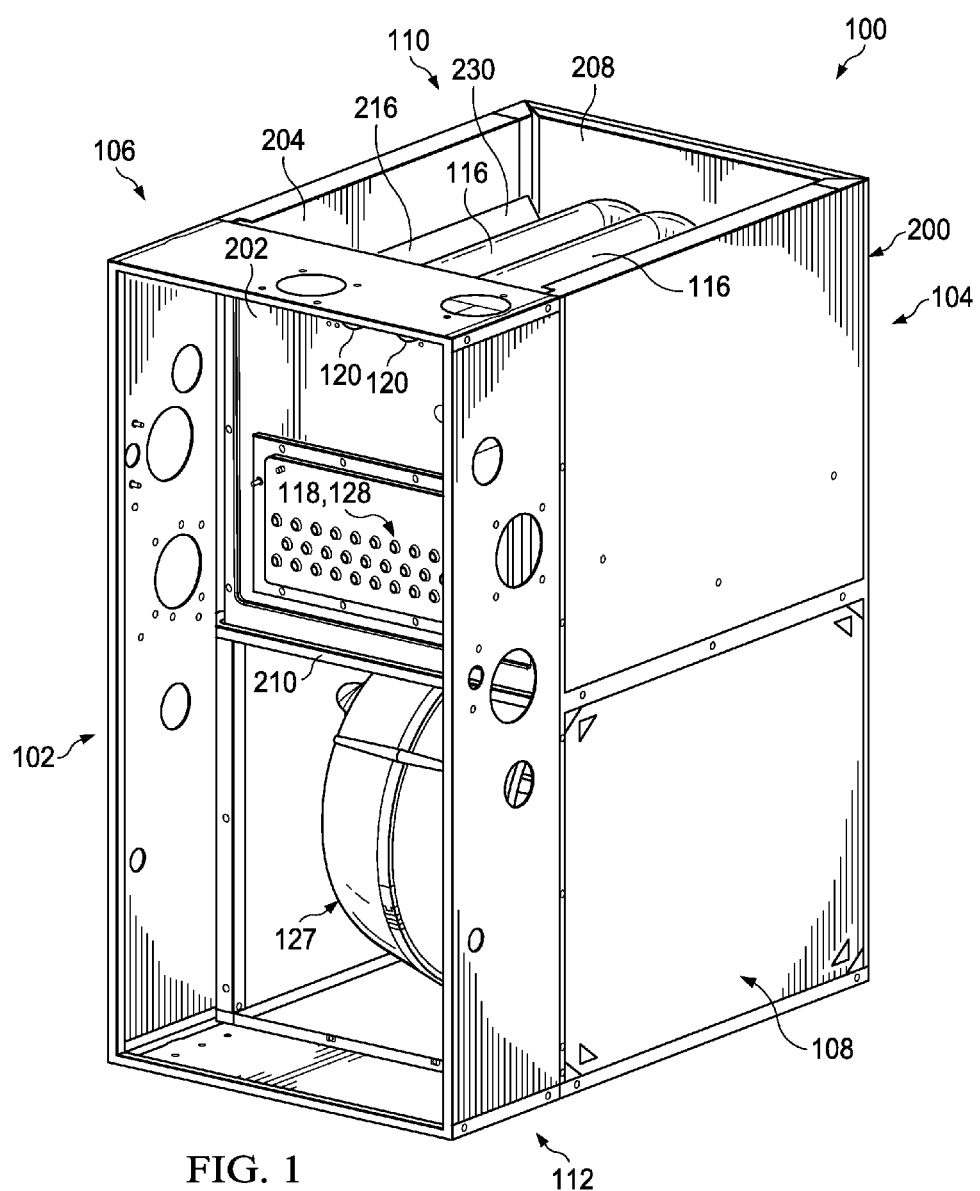
FIG. 1 is an oblique view of a furnace according to an embodiment of the disclosure.
Figure 2:
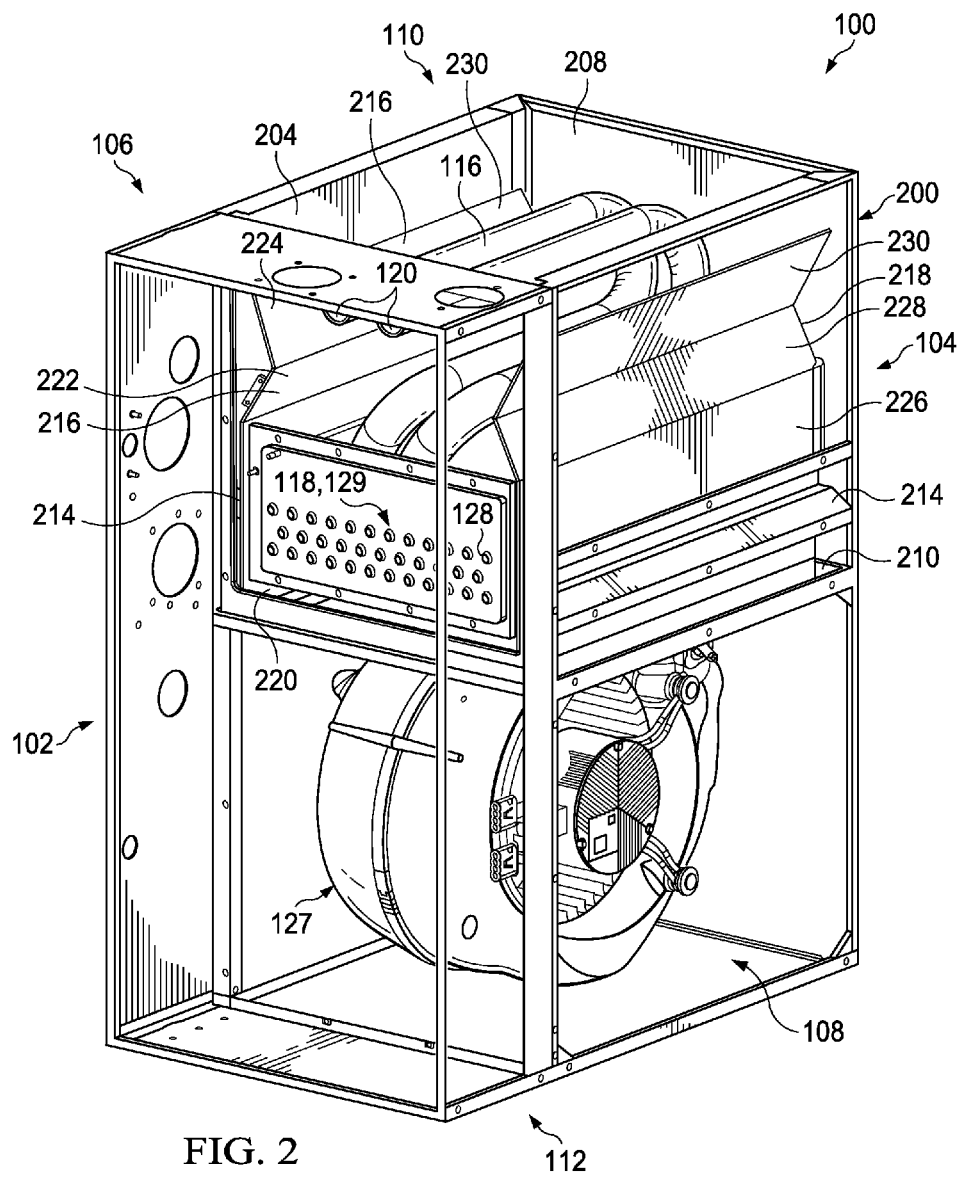
FIG. 2 is another oblique view of the furnace of FIG. 1 shown with some right side components of the furnace removed to better show the interior components of the furnace according to an embodiment of the disclosure.

Referring now to FIGS. 1 and 2, an oblique right side view of a condensing gas-fired furnace 100 and another oblique right side view of the furnace 100 having some right side components of the furnace 100 removed to better show the interior components of the furnace 100 are shown, respectively, according to an embodiment of the disclosure. In this embodiment, the furnace 100 is configured as an indoor furnace 100 that provides conditioned, heated air to an interior space. The components of the furnace 100, however, may be equally employed in an outdoor or weatherized furnace to condition an interior space. Moreover, the furnace 100 may be used in residential or commercial applications. The furnace 100 may generally comprise a front side 102, rear side 104, left side 106, right side 108, top side 110, and bottom side 112.

In this embodiment, the furnace 100 may comprise one or more burner assemblies configured to combust fuel and oxygen so that resultant combustion gases are forced into a plurality of primary heat exchangers 116, and thereafter into a finned, condensing, secondary heat exchanger 118. The primary heat exchangers 116 may extend from the burner assembly to the secondary heat exchanger 118. In this embodiment, each burner assembly may have an associated primary heat exchanger 116 such that the primary heat exchanger 116 is in the combustion airflow path of its associated burner assembly. In general, the total number of burner assemblies and/or primary heat exchangers 116 may vary depending upon the desired capacity of the furnace 100. In alternative embodiments, the furnace 100 may comprise a non-condensing furnace and the various components of the non-condensing furnace may be different than the components of furnace 100.

Figure 3:
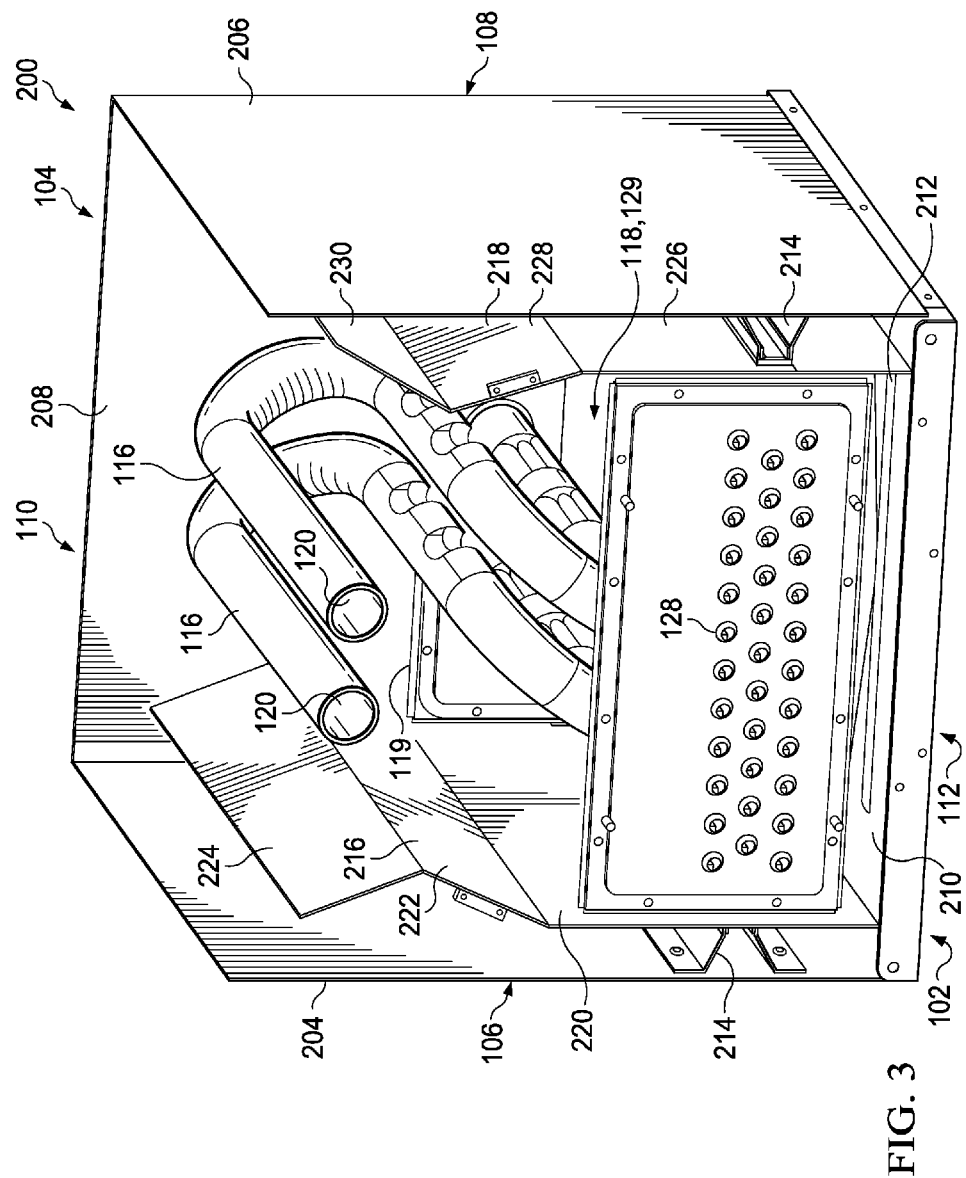
FIG. 3 is an oblique view of a furnace cabinet of the furnace of FIGS. 1-2 according to an embodiment of the disclosure.

Each primary heat exchanger 116 may comprise a bent, S-shaped tubular member that extends through a tortuous path to enhance the surface area available for heat transfer with the surrounding circulation air. Each primary heat exchanger 116 may comprise a first open end 120 defining a flue gas inlet and a second open end 122 defining a flue gas outlet. As shown in FIG. 3, the second open end 122 of each primary heat exchanger 116 may feed the secondary heat exchanger 118 so that the primary heat exchangers 116 transport hot flue gases to the secondary heat exchanger 118. Although the primary heat exchangers 116 are tubular in some embodiments, the primary heat exchangers 116 may comprise, for example, clamshell, drum, shell and tube-type, and/or any other suitable type of heat exchangers.

In general, combustion air may be introduced into the furnace 100 either in an induced draft mode by pulling air through the system or in a forced draft mode by pushing air through the system. In this embodiment, the induced draft mode may be employed by pulling the hot flue gases from the secondary heat exchanger 118 with a blower or fan by creating a relatively lower pressure at the exhaust of the secondary heat exchanger 118. A control system may control the blower or fan to an appropriate speed to achieve adequate air flow for a desired firing rate through the burner assemblies. Increasing the fan speed of the blower or fan may introduce more air to the air/fuel mixture, thereby changing the characteristics of the combustion within the burner assemblies.

A circulation blower 127 may blow circulation air across the external surfaces of the primary heat exchangers 116 and the secondary heat exchanger 118 to enable the transfer of thermal energy from the primary heat exchangers 116 and the secondary heat exchanger 118 to the air. The heated, exiting airflow may then be distributed to a conditioned area. The furnace 100 is shown in a first orientation in which the circulation blower 127 is closer to the bottom side 112 of the furnace 100 relative to the primary heat exchangers 116 and blows the circulation air across the primary heat exchangers 116 and upwards toward the top side 110 of the furnace 100.

While moving through the primary heat exchangers 116 and then the secondary heat exchanger 118, the hot flue gases may begin to cool and continue cooling as they move through the secondary heat exchanger 118. The flue gases may thereafter be directed to the outside environment. As the flue gases cool throughout the secondary heat exchanger 118, the flue gases may cool below the dew point temperature of the water vapor, which may be mixed with corrosive combustion products, producing a corrosive condensate. Accordingly, this system may be referred to as a condensing gas-fired furnace 100. A cold header may provide a drainage path for managing and/or draining the condensate and/or any other liquid. In some cases, the condensate may form within and/or flow through tubes 128 of the secondary heat exchanger 118. The secondary heat exchanger 118 may further comprise fins, and the combination of tubes 128 and associated fins are additionally represented as a heat exchanger slab 129. The tubes 128 may comprise a corrosion resistant metal, such as, but not limited to 29-4C stainless steel, 2205 stainless steel, T140 aluminized steel, and/or any other suitable corrosion resistant material.

Figure 4:
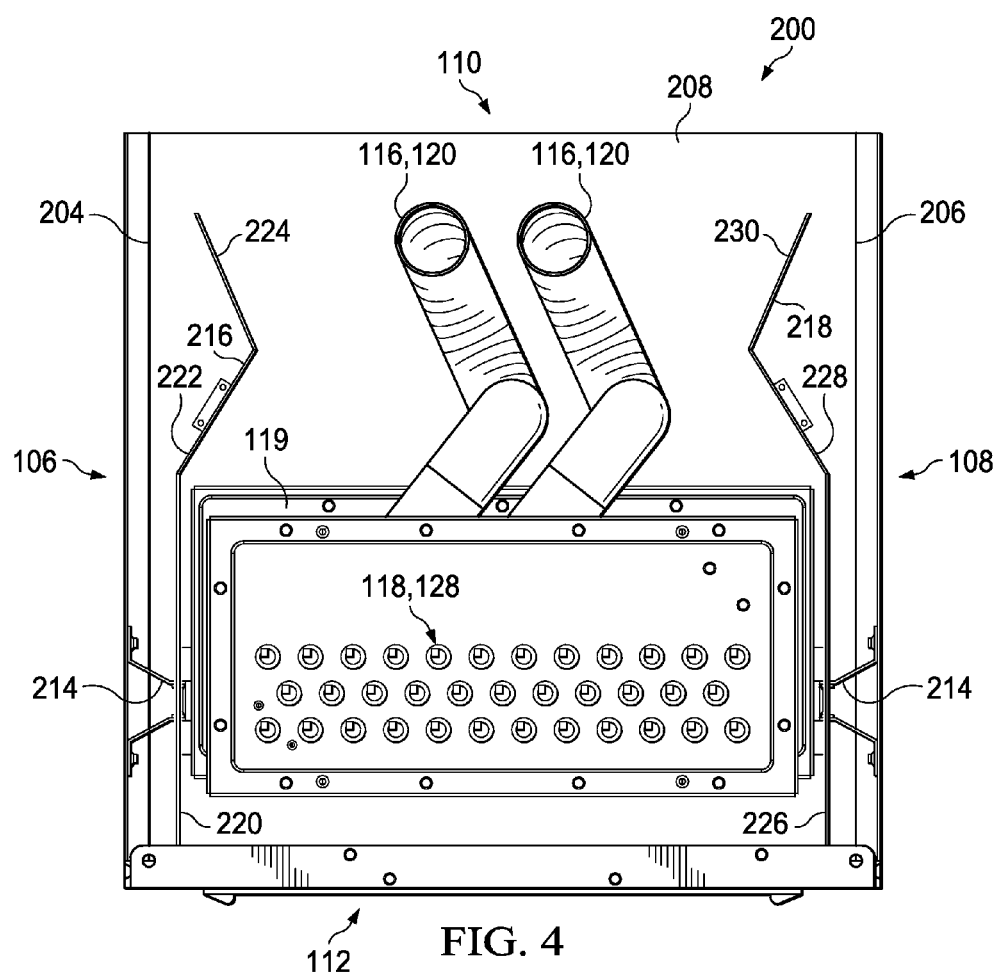
FIG. 4 is an orthogonal front view of the furnace cabinet of FIG. 3 according to an embodiment of the disclosure.
Figure 5:
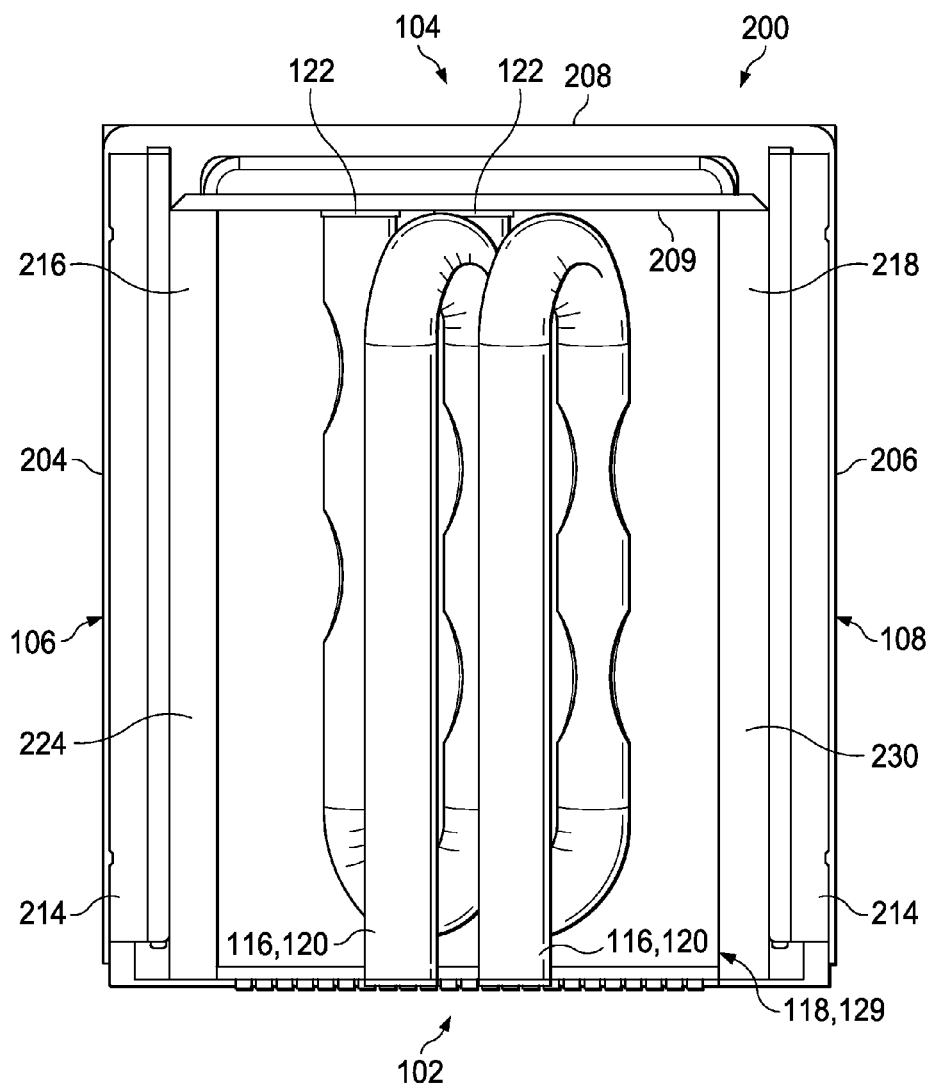
FIG. 5 is an orthogonal top view of the furnace cabinet of FIG. 3 according to an embodiment of the disclosure.

Referring now to FIGS. 3-5, an oblique view, orthogonal front view, and an orthogonal top view of a furnace cabinet 200 of the furnace 100 of FIGS. 1-2 are shown, respectively, without a front wall 202 (see FIGS. 1-2) attached. In some embodiments, the furnace cabinet 200 may be generalized as comprising an interior duct comprising the front wall 202, a left wall 204, a right wall 206, and a back wall 208. Generally, circulation air delivered through the furnace 100 by the circulation blower 127 may enter the furnace cabinet 200 though a lower wall 210 via an aperture 212 of the lower wall 210. Mounting rails 214 carried by the left wall 204 and the right wall 206 generally force air between mounting rails 214. Of course, in embodiments where the furnace 100 is a non-condensing furnace, the furnace 100 may comprise no secondary heat exchanger 118.

In this embodiment, the furnace cabinet 200 further comprises a left baffle 216 and a right baffle 218. The left baffle 216 generally comprises a twice bent plate formed to comprise a lower portion 220, a middle portion 222, and an upper portion 224. The lower portion 220 lies generally parallel to and offset from the left wall 204 and extends from the lower wall 210 vertically upward to a level about equal to a vertically middle portion of a lowermost bend of the primary heat exchangers 116. The middle portion 222 extends inwardly and upwardly from the lower portion 220 (1) from the left toward the right to a location about equal to a leftmost location of the secondary heat exchanger 118 and heat exchanger slab 129 and (2) vertically upward to a level about equal to a vertically middle portion of an uppermost bend of the primary heat exchangers 116. The upper portion 224 extends outwardly and upwardly from the middle portion 222 (1) from the right toward the left to a location about equal to the lower portion 220 and (2) vertically upward to a level about equal to a vertically middle portion of the first open end 120 of primary heat exchangers 116.

The right baffle 218 generally comprises a twice bent plate formed to comprise a lower portion 226, a middle portion 228, and an upper portion 230. The lower portion 226 lies generally parallel to and offset from the right wall 206 and extends from the lower wall 210 vertically upward to a level about equal to a vertically middle portion of a lowermost bend of the primary heat exchangers 116. The middle portion 228 extends inwardly and upwardly from the lower portion 226 (1) from the right toward the left to a location about equal to a rightmost location of the secondary heat exchanger 118 and heat exchanger slab 129 and (2) vertically upward to a level about equal to a vertically middle portion of an uppermost bend of the primary heat exchangers 116. The upper portion 230 extends outwardly and upwardly from the middle portion 228 (1) from the left toward the right to a location about equal to the lower portion 226 and (2) vertically upward to a level about equal to a vertically middle portion of the first open end 120 of primary heat exchangers 116. Both the left baffle 216 and right baffle 218 extend from a back plate 209 toward the front wall 202 but stop short of extending to the front wall 202. Instead of extending all the way to the front wall 202, the left baffle 216 and right baffle 218 extend to a front plate that is slightly offset rearward from the front wall 202.

In some embodiments, the left baffle 216 and right baffle 218 may work together to direct circulation airflow toward the primary heat exchangers 116 so that circulation airflow is prevented from bypassing the primary heat exchangers 116. In some embodiments, the left baffle 216 and right baffle 218 work together to provide a nozzle effect so that air is first forced through a decreasing cross-sectional zone between the middle portions 222, 228 and thereafter allowed to expand through an increasing cross-sectional zone between the upper portions 224, 230. The nozzle effect allows the furnace 100 to both increasingly force circulation air into contact with the primary heat exchangers 116 at higher velocities as provided by the opposing and converging middle portions 222, 228 while later allowing for a pressure recovery. The converging middle portions 222, 228 may contribute to an increase in heat exchange between the circulation airflow and the primary heat exchangers 116. The pressure recovery is provided by the opposing and diverging upper portions 224, 230. The pressure recovery may reduce an amount of power required to force air through the furnace 100.

Furthermore, each of the left baffle 216 and right baffle 218 are attached directly to a secondary heat exchanger 118 hot header plate 119 so that primary heat exchangers 116, secondary heat exchanger 118, and headers connecting the heat exchangers 116, 118 can be easily removed from the cabinet without the need to first remove the left baffle 216 or right baffle 218 (See FIGS. 3-4).

Figure 10:
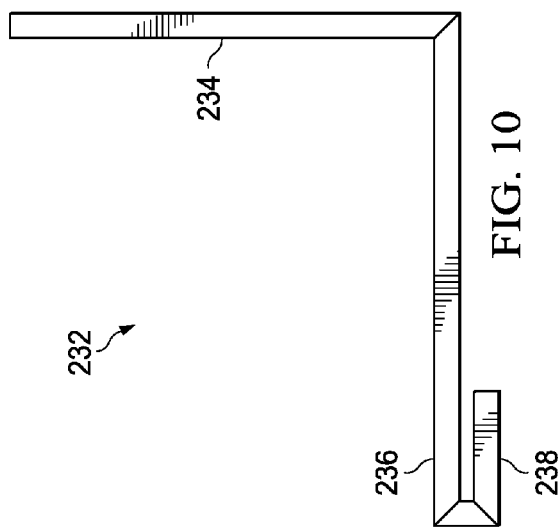
FIG. 10 is an oblique end view of a blower deck baffle according to an embodiment of the disclosure.

Referring now to FIG. 10, an orthogonal front end view of a blower deck baffle 232 is shown. The blower deck baffle 232 generally comprises an upstanding wall 234 connected to a floor wall 236. The upstanding wall 234 is oriented generally at a 90 degree angle relative to the floor wall 236. Additionally, in some embodiments, an underturned lip 238 may be connected to the floor wall 236. In some embodiments, blower deck baffles 232 may be secured to the lower wall 210 and utilized to ensure that air pressure does not force the lower portions 220, 226 outward and away from each other so that air is allowed to bypass the secondary heat exchanger 118.

Figure 11:
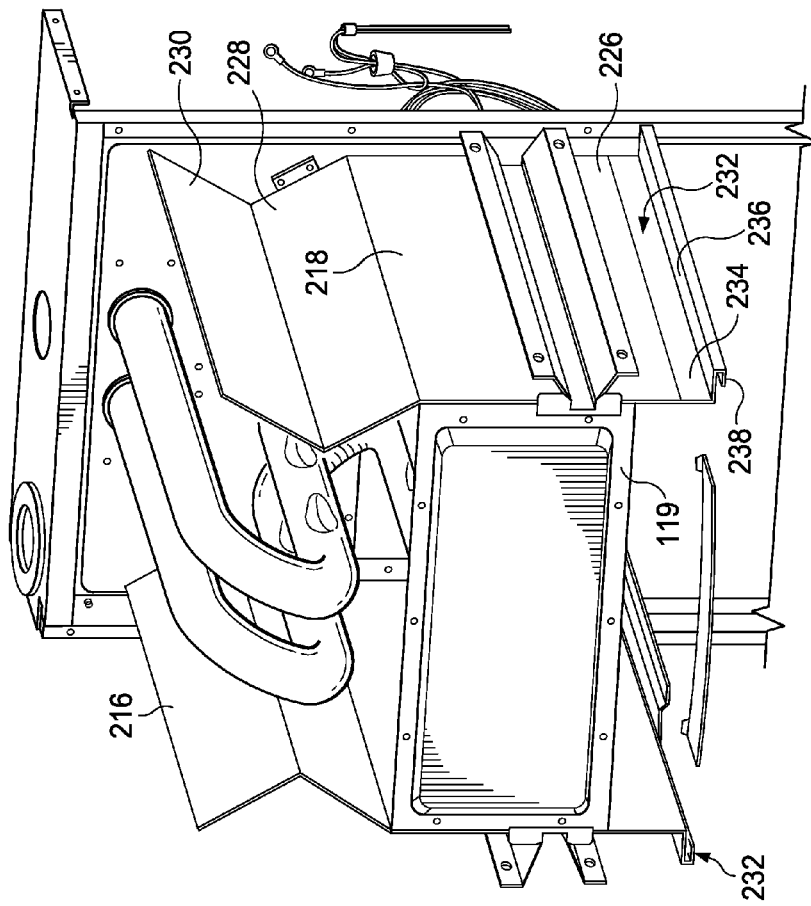
FIG. 11 is an oblique view of the furnace cabinet of the furnace having the blower deck baffle of FIG. 10 configured to serve as a backstop is shown according to an embodiment of the disclosure.

Referring now to FIG. 11, an oblique view of the furnace cabinet 200 of the furnace 100 having the blower deck baffle 232 of FIG. 10 configured to serve as a backstop is shown according to an embodiment of the disclosure. Of course, an additional blower deck baffle 232 may be similarly used to serve as a backstop to the lower portion 220. The blower deck baffles 232 may also assist in reducing recirculation of circulation air. In some embodiments, one blower deck baffle 232 may be connected to the lower portion 220, and a second blower deck baffle 232 may be connected to the lower portion 226. Additionally, in some embodiments, the blower deck baffles 232 may be connected to a blower deck, which may, at least in some embodiments, restrict air from bypassing the secondary heat exchanger 118 while allowing the secondary heat exchanger 118 to be removed from the furnace cabinet 200 without removing the blower deck baffles 232.

Figure 6A:
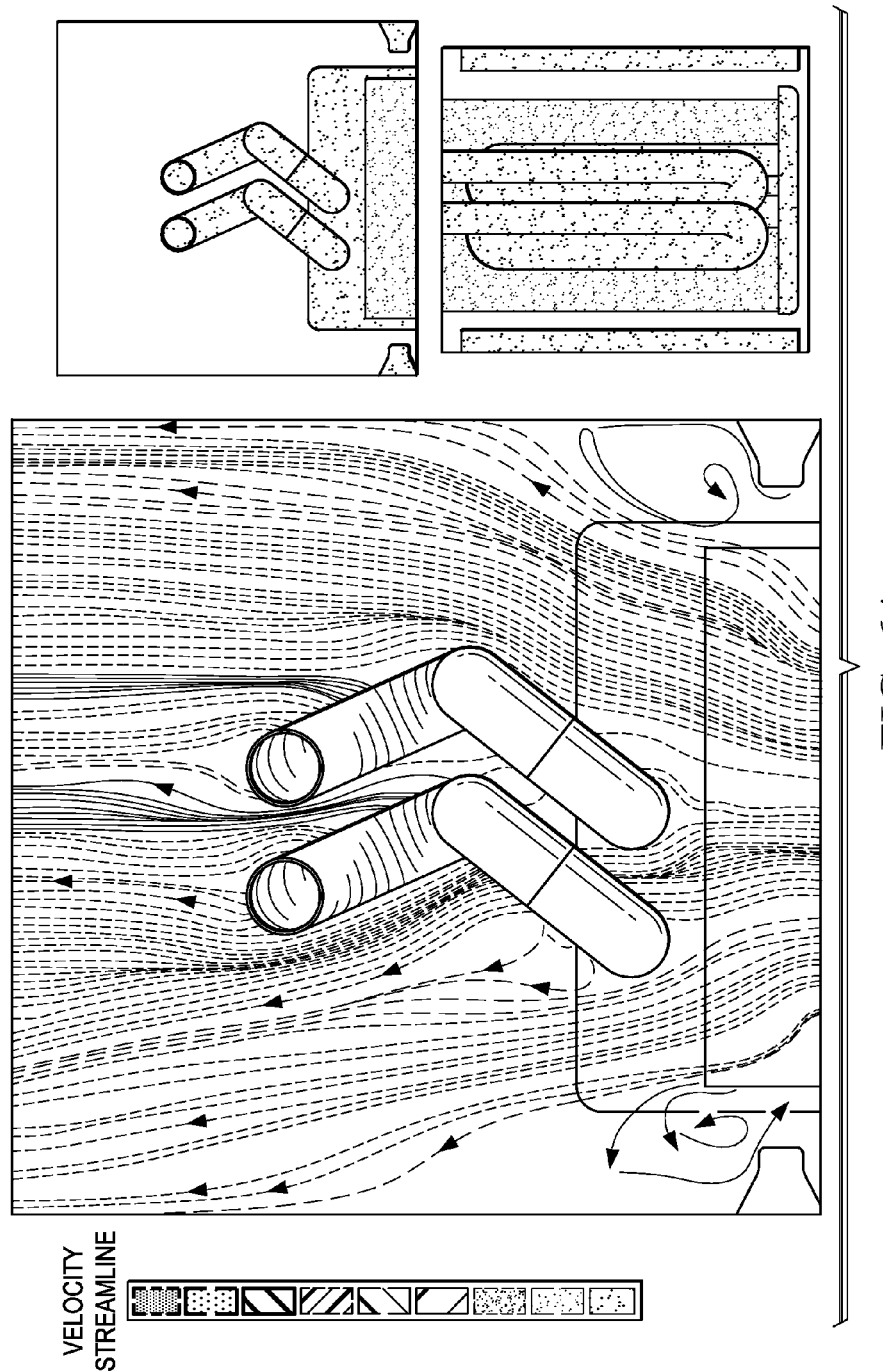
FIG. 6A is an airflow streamline at an orthogonal plane within a prior art furnace comprising no baffles.

Referring now to Prior Art FIG. 6A, an orthogonal front view of a computational fluid dynamic analysis of circulation airflow through a prior art furnace cabinet comprising no baffles is shown.

Figure 6B:
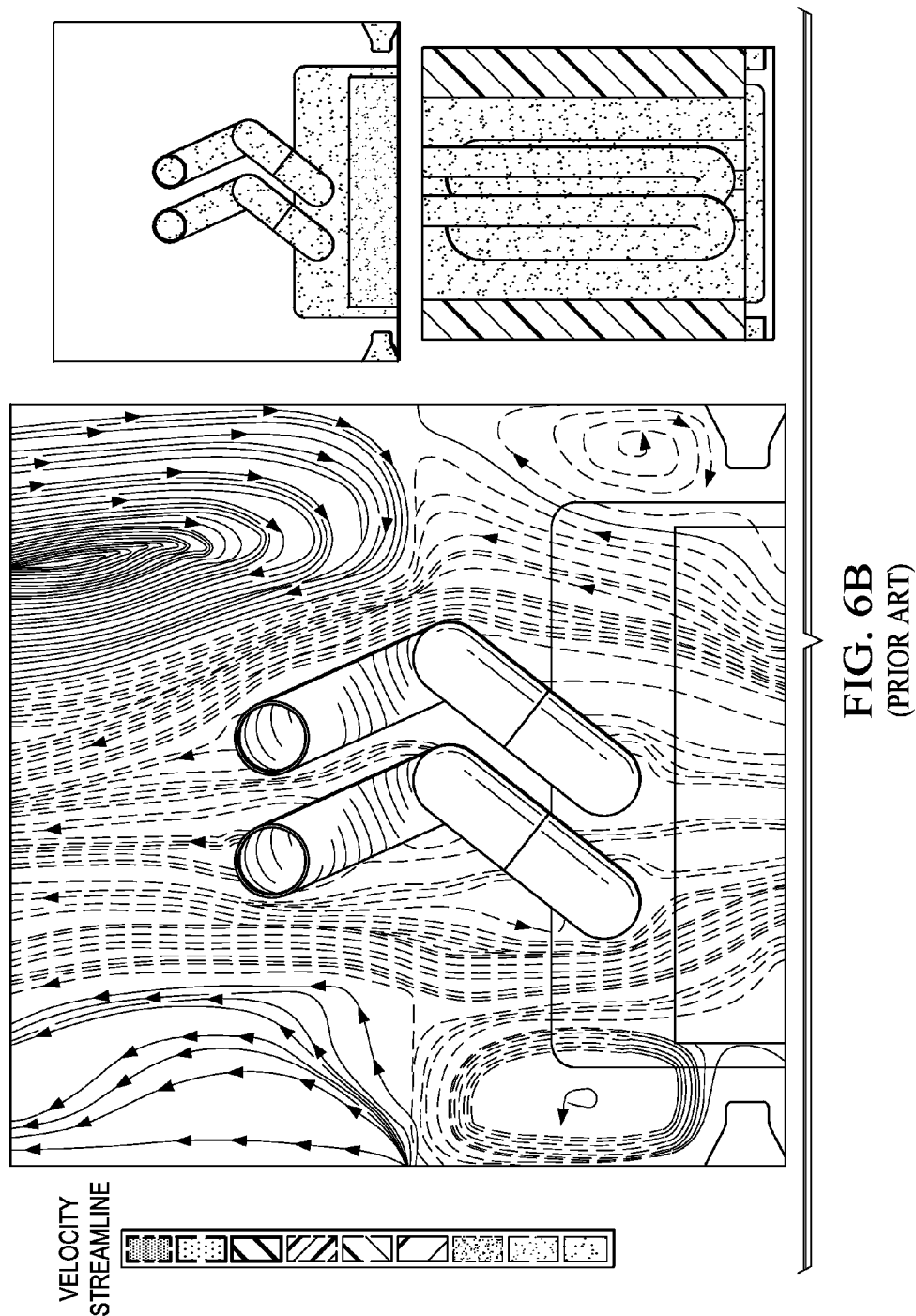
FIG. 6B is an airflow streamline at an orthogonal plane within a prior art furnace comprising two bluntly located baffles.

Referring now to Prior Art FIG. 6B, an orthogonal front view of a computational fluid dynamic analysis of circulation airflow through a prior art furnace cabinet comprising two bluntly located baffles is shown.

Figure 6C:
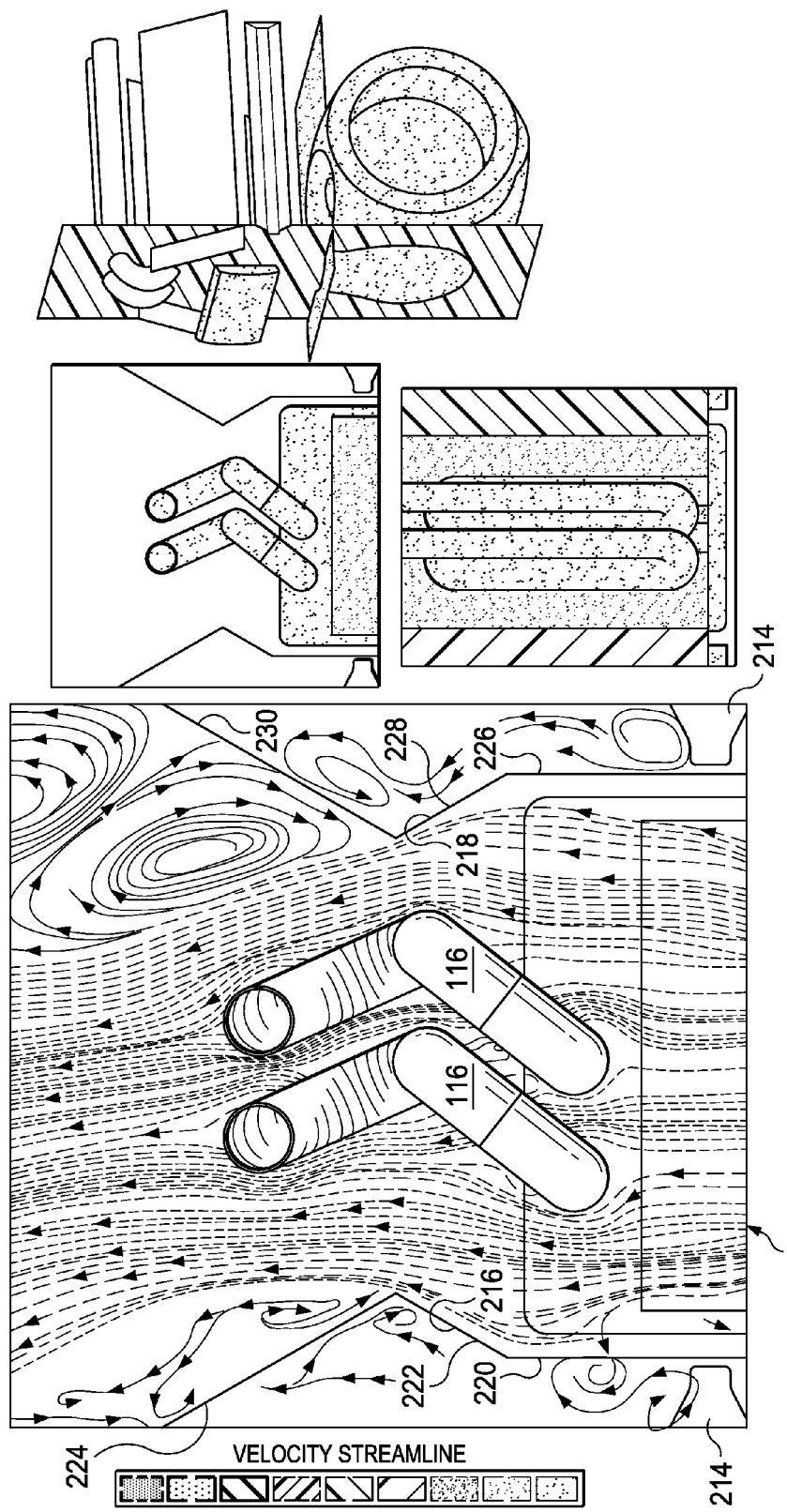
FIG. 6C is an airflow streamline at an orthogonal plane within the furnace cabinet of FIGS. 3-5 according to an embodiment of the disclosure.

Referring now to FIG. 6C, an orthogonal front view of a computational fluid dynamics analysis of circulation airflow through the furnace cabinet 200 of the furnace 100 is shown. In particular, FIG. 6C shows a velocity streamline representation of how provision of the baffles 216, 218 cause circulation airflow to encounter a primary heat exchanger 116 at higher air velocity as distance is increased in the vertically upward direction in the converging portion of the above-described nozzle and thereafter allows a decrease in air velocity as distance is increased in the vertically upward direction in the diverging portion of the above-described nozzle. FIG. 6C also particularly illustrates the minimizing of recirculation and separation zones adjacent to the mounting rails 214 and adjacent to the tubes of the primary heat exchanger 116. Velocities are increased while minimizing impact to pressure drop of the circulation air system within the heat exchanger cavity. FIG. 6C additionally comprises a schematic orthogonal front view of the furnace cabinet 200, a schematic orthogonal top view of the furnace cabinet 200, and an oblique view of the furnace 100 showing the analysis plane location.

Figure 7A:
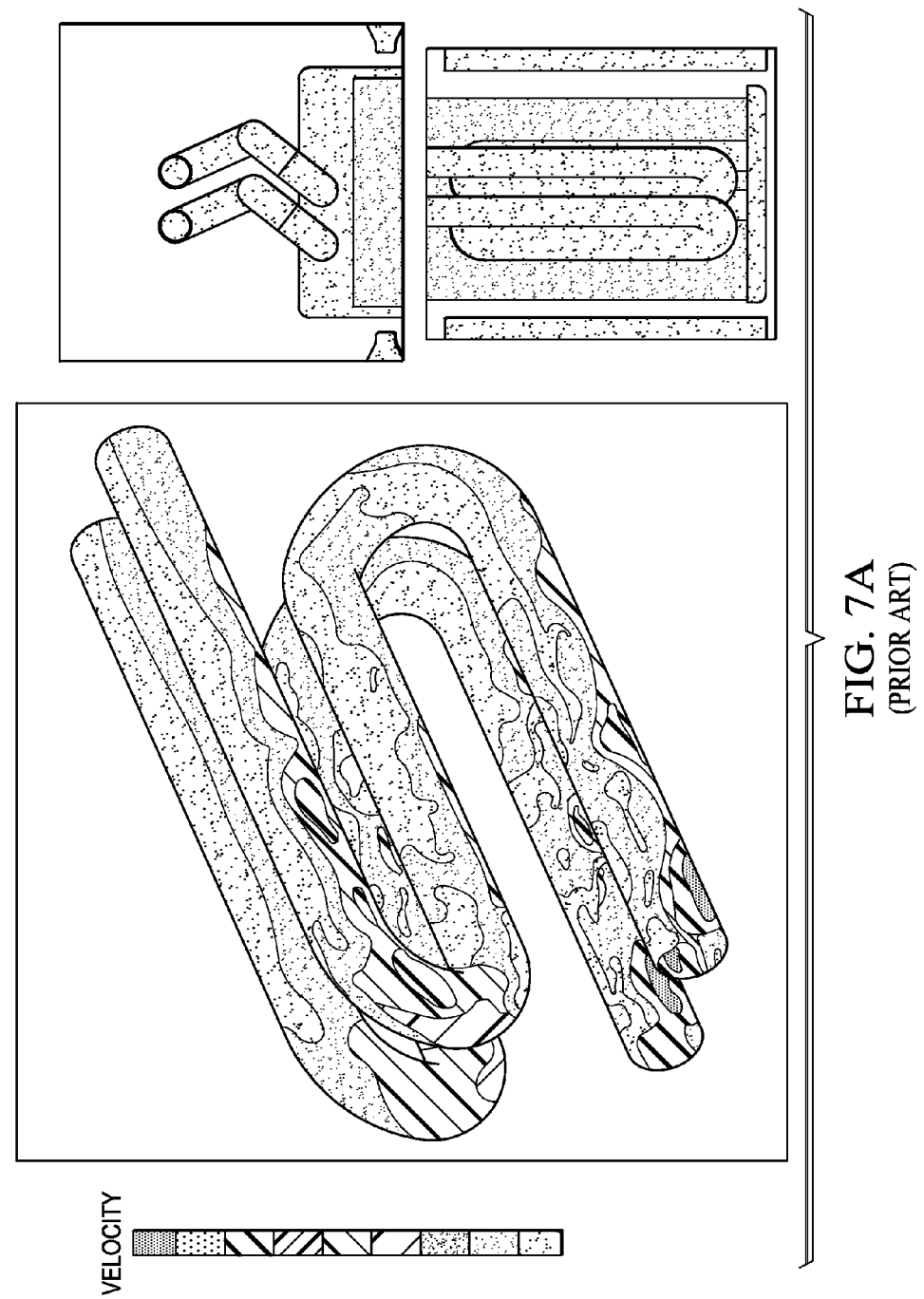
FIG. 7A is an airflow velocity contour of air contacting a primary heat exchanger of a prior art furnace cabinet comprising no baffles.

Referring now to Prior Art FIG. 7A, an oblique view of primary heat exchangers of a prior art furnace comprising no baffles is shown with a velocity contour mapped on the surfaces of the primary heat exchangers.

Figure 7B:
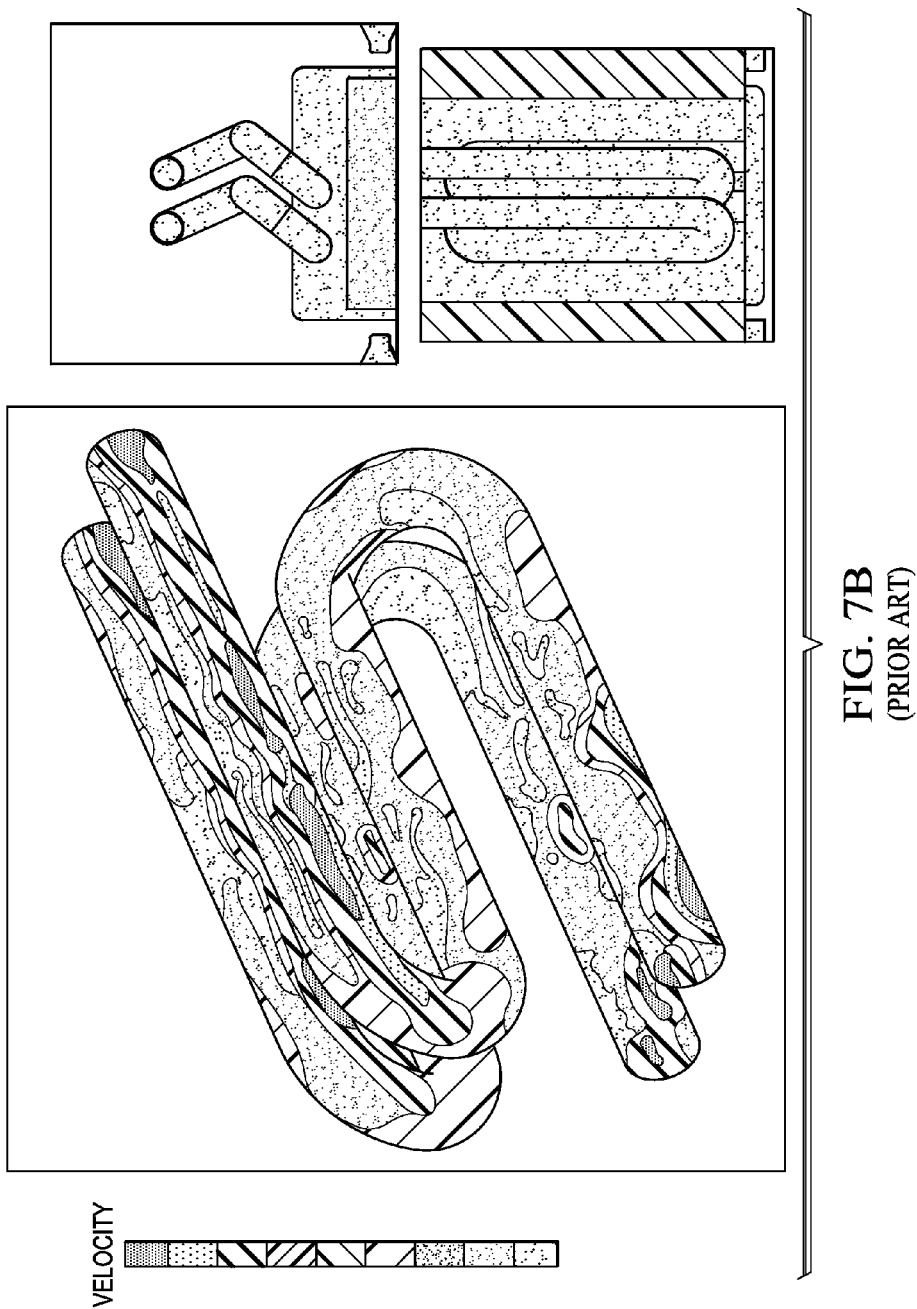
FIG. 7B is an airflow velocity contour of air contacting a primary heat exchanger of a prior art furnace cabinet comprising two bluntly located baffles.

Referring now to Prior Art FIG. 7B, an oblique view of primary heat exchangers of a prior art furnace comprising two bluntly located baffles is shown with a velocity contour mapped on the surfaces of the primary heat exchangers.

Figure 7C:
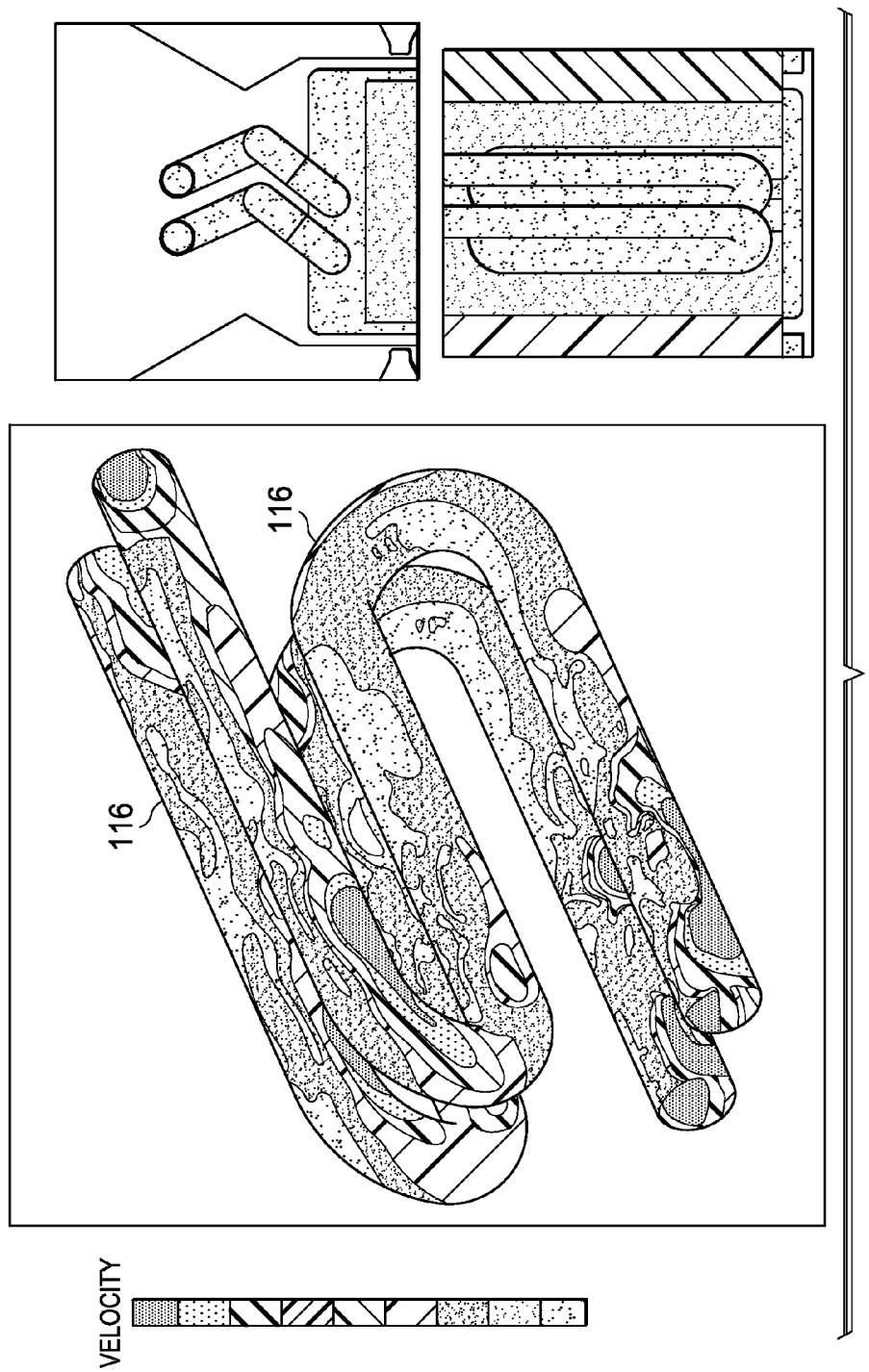
FIG. 7C is an airflow velocity contour of air contacting a primary heat exchanger of the furnace cabinet of FIGS. 3-5 according to an embodiment of the disclosure.

Referring now to FIG. 7C, the primary heat exchangers 116 of furnace 100 are shown with a velocity contour mapped on the surfaces of the primary heat exchangers 116.

Figure 8A:
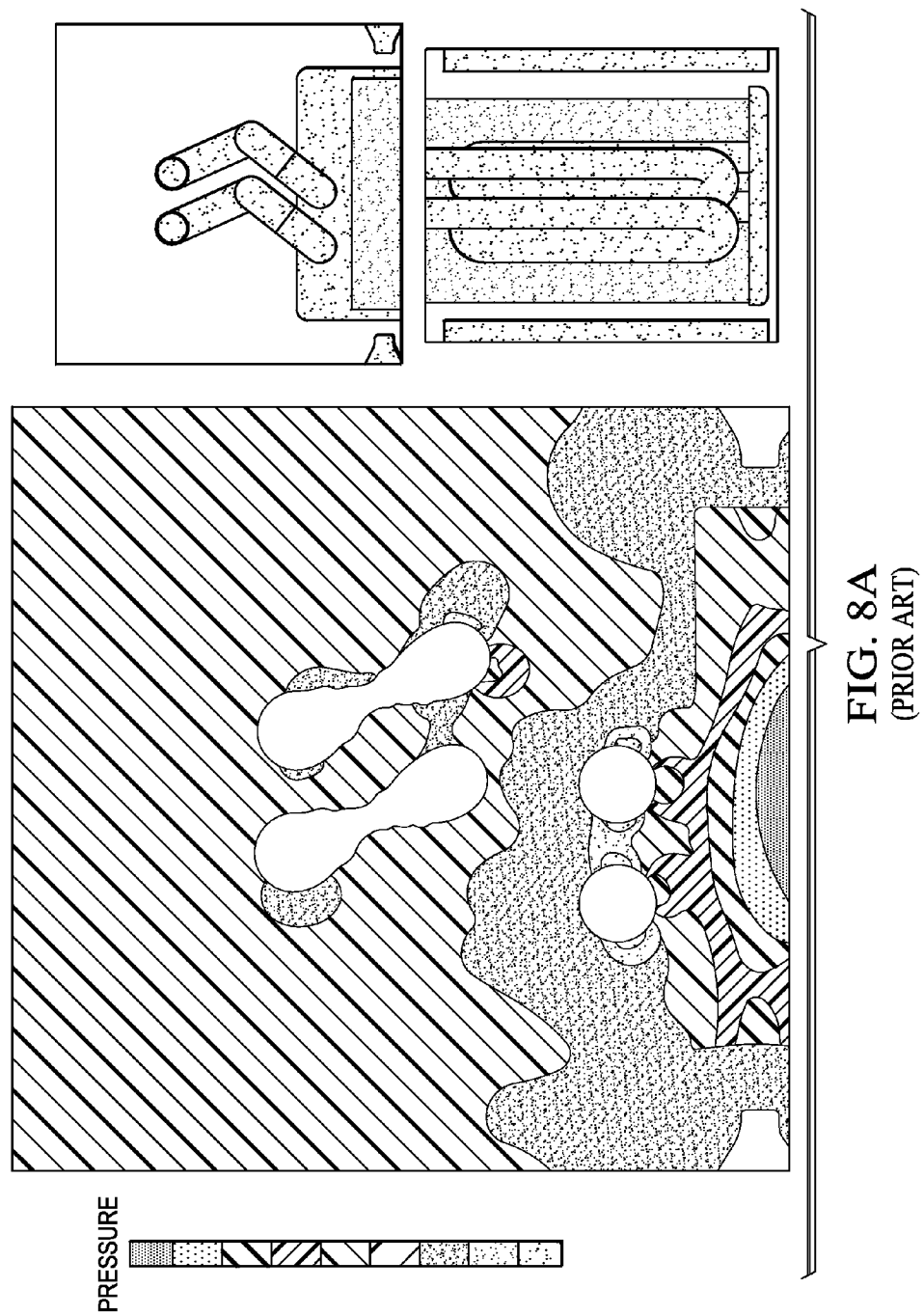
FIG. 8A is a normalized pressure drop contour of airflow circulation through a prior art furnace comprising no baffles.

Referring now to Prior Art FIG. 8A, an orthogonal front view of a computational fluid dynamic analysis of a normalized pressure drop contour of circulation airflow through a prior art furnace cabinet comprising no baffles is shown.

Figure 8B:
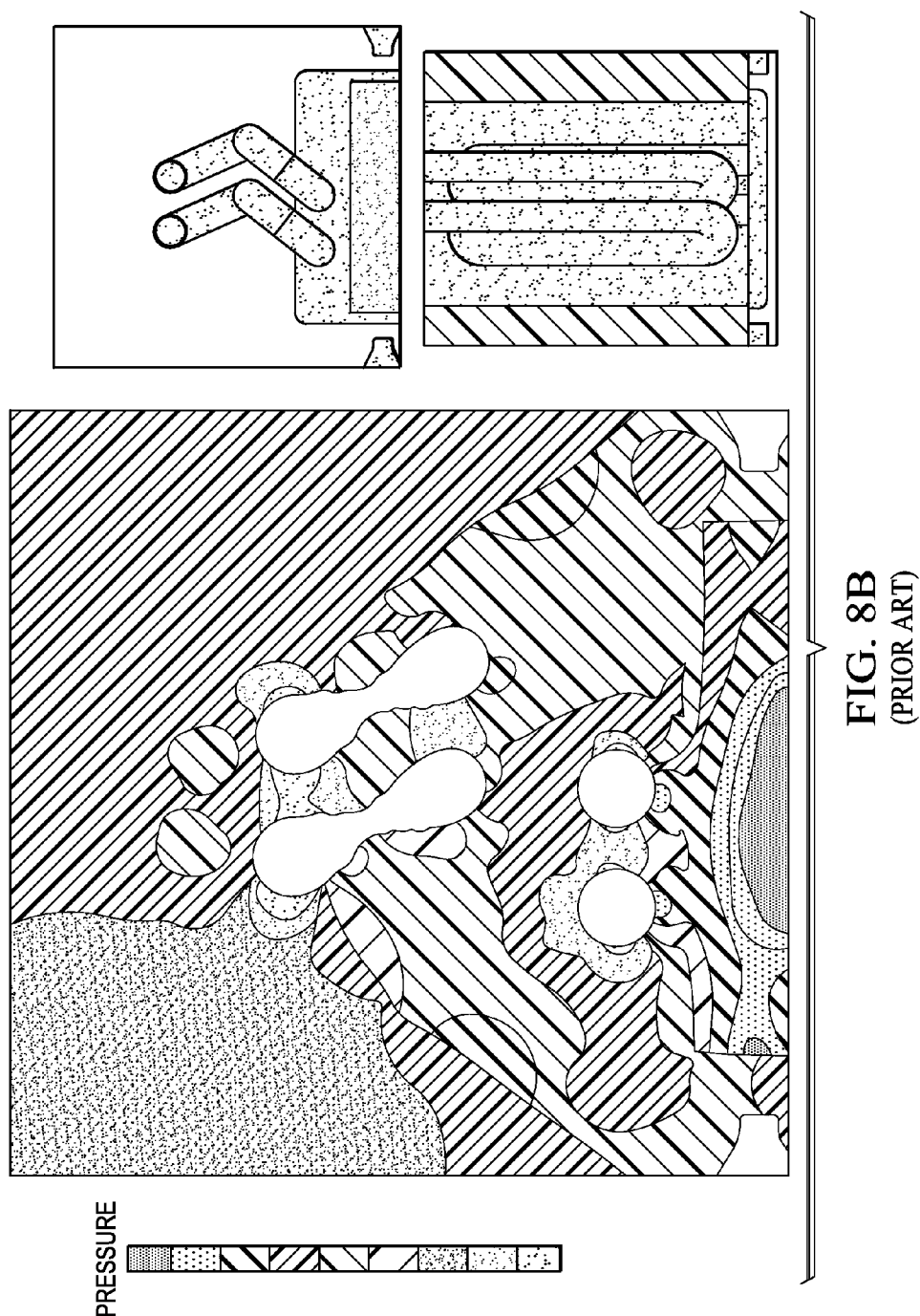
FIG. 8B is a normalized pressure drop contour of airflow circulation through a prior art furnace comprising two bluntly located baffles.

Referring now to Prior Art FIG. 8B, an orthogonal front view of a computational fluid dynamic analysis of a normalized pressure drop contour of circulation airflow through a prior art furnace cabinet comprising two bluntly located baffles is shown.

Figure 8C:
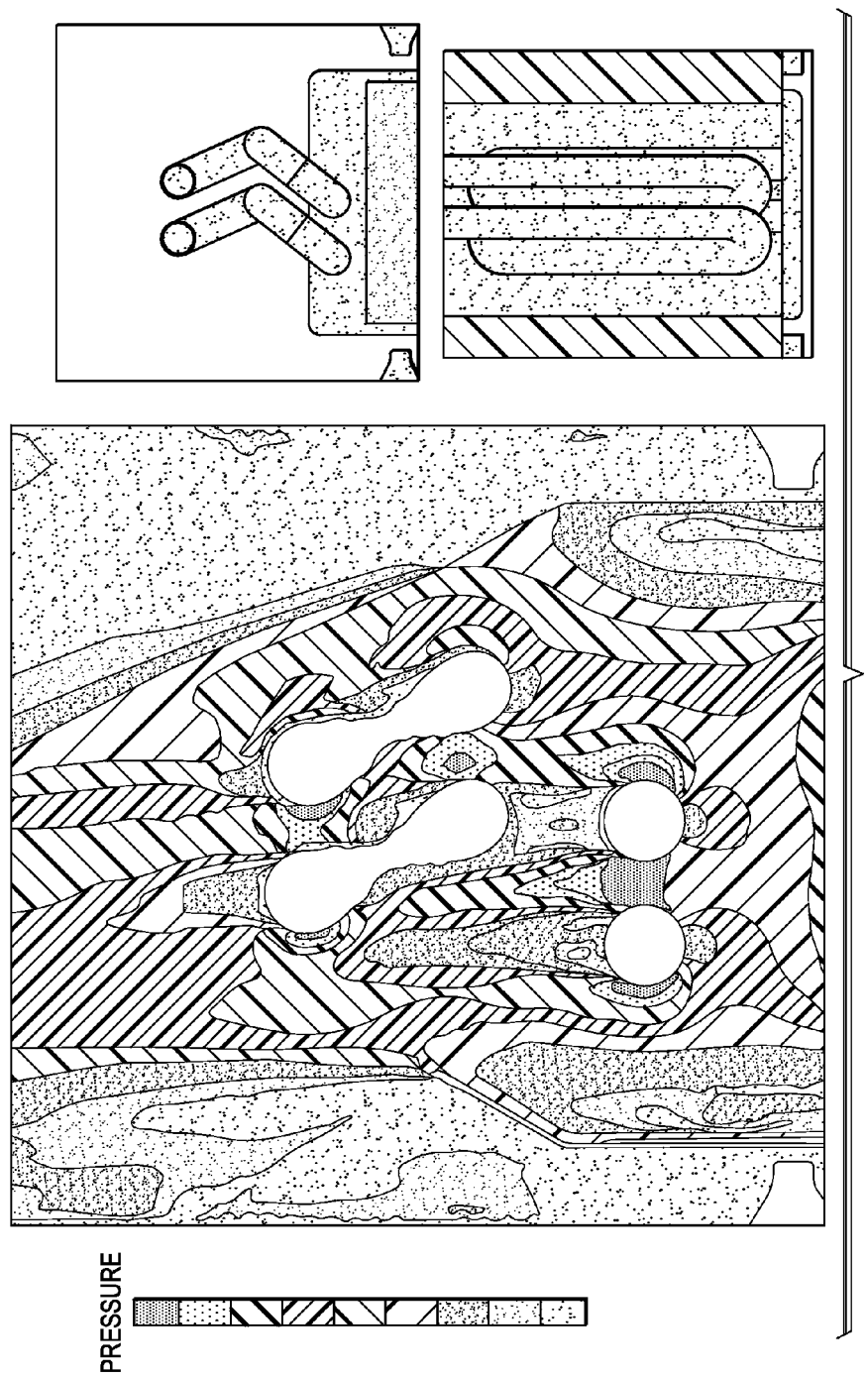
FIG. 8C is a normalized pressure drop contour of airflow circulation through the furnace cabinet of FIGS. 3-5 according to an embodiment of the disclosure.

Referring now to FIG. 8C, an orthogonal front view of a computational fluid dynamic analysis of a normalized pressure drop contour of circulation airflow through the furnace 100 is shown.

Figure 9A:
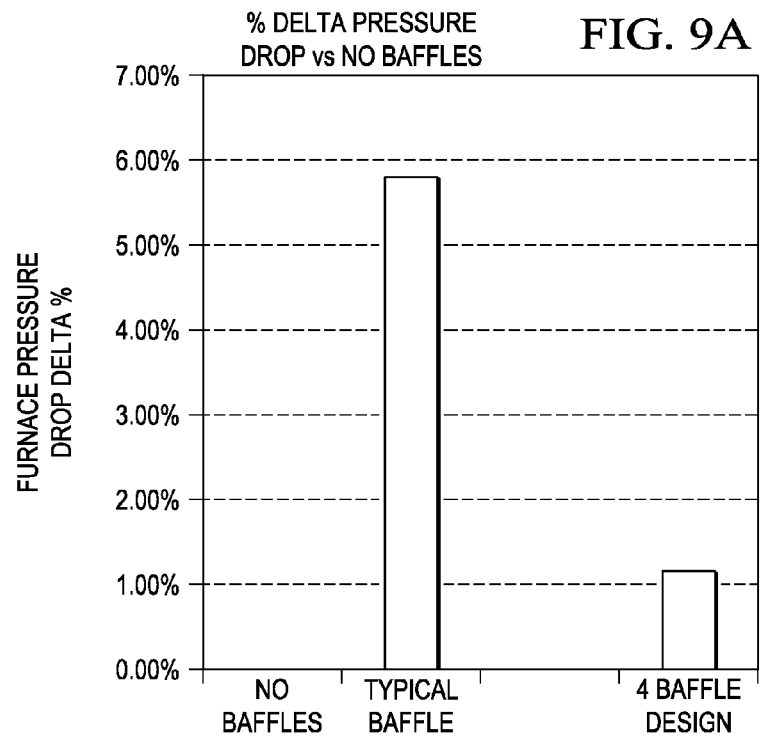
FIG. 9A is a chart comparing percent changes in pressure drop amongst a prior art furnace cabinet comprising no baffles, a prior art furnace cabinet comprising two bluntly located baffles, and the furnace cabinet of FIGS. 3-5 according to an embodiment of the disclosure.

Referring now to FIG. 9A, a chart showing a percentage change in pressure drop across the furnace 100 (4 baffle design) as compared to each of a prior art furnace comprising no baffles and a prior art furnace comprising typical baffles (two bluntly located baffles) is provided.

Figure 9B:
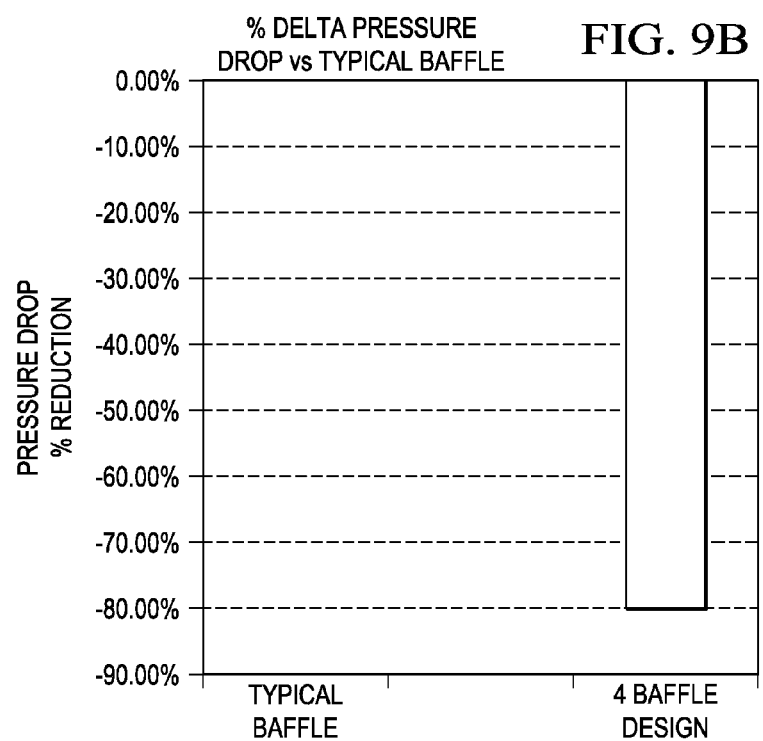
FIG. 9B is a chart comparing percent changes in pressure drop of a prior art furnace cabinet with two bluntly located baffles and the furnace cabinet of FIGS. 3-5 according to an embodiment of the disclosure.

Referring now to FIG. 9B, a chart showing a percentage pressure drop reduction comparison between the furnace 100 (4 baffle design) and a prior art furnace comprising typical baffles (two bluntly located baffles) is provided.

It will be appreciated that the location and/or dimensions of the baffles 216, 218 disclosed herein may be altered and/or optimized for use with alternative arrangements of primary heat exchangers 116 and/or secondary heat exchangers 118.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A furnace, comprising:
   a furnace cabinet;
   a primary heat exchanger;
   a secondary heat exchanger located upstream relative to the primary heat exchanger with regard to location within a circulation airflow path;
   a first baffle carried by a first wall of the furnace cabinet; and
   a second baffle carried by a second wall of the furnace cabinet, wherein the second baffle is located opposite the first baffle, and wherein the second wall is located opposite the first wall;
   wherein each of the first baffle and the second baffle comprises a respective twice bent plate defining respective and opposing lower portions, middle portions, and upper portions, and
   wherein the first baffle and the second baffle cooperate to form a nozzle within the furnace cabinet.

2. The furnace of claim 1, wherein the lower portion of the first baffle is disposed between the secondary heat exchanger and the first wall, and wherein the lower portion of the second baffle is disposed between the secondary heat exchanger and the second wall.

3. The furnace of claim 2, wherein each of the first baffle and the second baffle begin protruding toward a center of the furnace cabinet from locations downstream relative to the secondary heat exchanger.

4. The furnace of claim 3, wherein each of the first baffle and the second baffle begin protruding toward a center of the furnace cabinet from locations upstream relative to a most downstream portion of the primary heat exchanger.

5. The furnace of claim 4, wherein each of the lower portion of the first baffle and the lower portion of the second baffle extend downstream a distance sufficient to overlap at least a portion of the primary heat exchanger.

6. The furnace of claim 5, wherein each of the upper portion of the first baffle and the upper portion of the second baffle extend substantially to the first wall and to the second wall, respectively.

7. The furnace of claim 6, wherein the first baffle and the second baffle are configured to direct a circulation airflow toward the primary heat exchanger so that the circulation airflow is prevented from bypassing the primary heat exchanger.

8. The furnace of claim 7, wherein the left baffle and the right baffle are configured to provide a nozzle effect so that air is first forced through a decreasing cross-sectional zone between converging middle portions of the first baffle and the second baffle and thereafter allowed to expand through an increasing cross-sectional zone between the respective upper portions of the first baffle and the second baffle.

9. The furnace of claim 8, wherein the first baffle and the second baffle are configured to increasingly force the circulation airflow into contact with the primary heat exchanger at higher velocities as provided by the respective and opposing middle portions of the left baffle and the right baffle converging.

10. The furnace of claim 9, wherein each of the primary heat exchanger and the secondary heat exchanger are removable from the furnace cabinet by sliding both the primary heat exchanger and the secondary heat exchanger away from a third wall that generally joins the first wall to the second wall.

11. The furnace of claim 6, further comprising:
    a third baffle; and
    a fourth baffle;
    wherein the third baffle extends from a bottom of the first baffle, and wherein the fourth baffle extends from a bottom of the second baffle, and
    wherein the secondary heat exchanger is removable from the furnace without removing the third and fourth baffles.

12. A method of operating a furnace, comprising:
    providing a furnace comprising a furnace cabinet, a fan, a primary heat exchanger, a secondary heat exchanger located upstream relative to the primary heat exchanger with regard to location within a circulation airflow path, a first baffle carried by a first wall of the furnace cabinet, and a second baffle carried by a second wall of the furnace cabinet, wherein the second baffle is located opposite the first baffle, wherein the second wall is located opposite the first wall, and wherein each of the first baffle and the second baffle is connected to a hot header plate disposed to the second heat exchanger and configured to allow the primary heat exchanger and the secondary heat exchanger to be removed form the furnace without first removing the left baffle or the right baffle;

operating the fan to produce a circulation airflow;

directing the circulation airflow towards the primary heat exchanger with each of the first baffle and the second baffle; and exchanging heat between the circulation airflow and the primary heat exchanger.

13. The method of claim 12, further comprising:

protruding a lower portion of each of the first baffle and the second baffle towards a center of the furnace cabinet from locations downstream relative to the secondary heat exchanger.

14. The method of claim 13, further comprising:

protruding a lower portion of each of the first baffle and the second baffle towards a center of the furnace cabinet from locations upstream relative to a most downstream portion of the primary heat exchanger.

15. The method of claim 14, further comprising:

extending each of the lower portion of the first baffle and the lower portion of the second baffle downstream a distance sufficient to overlap at least a portion of the primary heat exchanger.

16. The method of claim 15, further comprising:

extending each of an upper portion of the first baffle and an upper portion of the second baffle substantially to the first wall and to the second wall, respectively.

17. The method of claim 16, further comprising:

forcing the circulation airflow through a decreasing cross-sectional zone between converging middle portions of the first baffle and the second baffle.

18. The method of claim 17, further comprising:

increasingly forcing the circulation airflow into contact with the primary heat exchanger at higher velocities as provided by the converging middle portions of the left baffle and right baffle.

19. The method of claim 18, further comprising:

expanding the circulation airflow through an increasing cross-sectional zone between upper portions of the first baffle and the second baffle.

20. A furnace, comprising:

a furnace cabinet;

a primary heat exchanger;

a secondary heat exchanger located upstream relative to the primary heat exchanger with regard to location within a circulation airflow path;

a first baffle carried by a first wall of the furnace cabinet; and a second baffle carried by a second wall of the furnace cabinet disposed opposite the first wall, wherein opposing and converging middle portions of the left baffle and the right baffle are immediately followed by opposing and diverging upper portions of the respective left baffle and right baffle.

* * * * *